(12) United States Patent  
Watanabe

(10) Patent No.: US 7,261,864 B2  
(45) Date of Patent: Aug. 28, 2007

(54) CATALYST CARRIER HOLDING MATERIAL AND CATALYTIC CONVERTER

(75) Inventor: Toshiyuki Watanabe, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 629 days.

(21) Appl. No.: 10/478,946

(22) PCT Filed: Jun. 21, 2002

(86) PCT No.: PCT/US02/19904

§ 371 (c)(1),
(2), (4) Date: Nov. 21, 2003

(87) PCT Pub. No.: WO03/000414

PCT Pub. Date: Jan. 3, 2003

(65) Prior Publication Data

US 2004/0156760 A1     Aug. 12, 2004

(30) Foreign Application Priority Data

Jun. 22, 2001    (JP) ............................ 2001-190005

(51) Int. Cl.
*F01N 3/08*    (2006.01)
(52) U.S. Cl. ...................... 422/179; 422/177
(58) Field of Classification Search ............... 422/179, 422/221
See application file for complete search history.

(56) References Cited

U.S. PATENT DOCUMENTS

| 3,441,381 | A | 4/1969 | Keith et al. ................. 422/176 |
| RE27,447 | E | 8/1972 | Richards ..................... 29/527.7 |
| 4,159,205 | A | 6/1979 | Miyahara et al. ............ 501/153 |
| 4,985,212 | A | 1/1991 | Kawakami et al. ......... 422/179 |
| 5,580,532 | A | 12/1996 | Robinson et al. ........... 422/179 |
| 6,251,815 | B1 * | 6/2001 | Parthasarathy et al. .... 501/95.2 |

FOREIGN PATENT DOCUMENTS

EP    0 765 993 A1    4/1997

(Continued)

OTHER PUBLICATIONS

Stroom et al., "*System Approach to Packaging Design for Automotive Catalytic Converters*",*SAE Technical Papers*, Document No. 900500, Feb. 26, 1990.

(Continued)

*Primary Examiner*—Glenn Caldarola
*Assistant Examiner*—Tom P. Duong
(74) *Attorney, Agent, or Firm*—Harold C. Knecht, III

(57) ABSTRACT

To provide a catalyst carrier holding material which is particularly useful for catalytic converters, by exhibiting heat resistance and high compression resistance in high temperature ranges, as well as excellent wind erosion resistance. The catalyst carrier holding material comprises inorganic fibers comprising alumina and silica, and the mullite ratio of the inorganic fibers is in the range of greater than 30% and less than 75%, and preferably in the range of 35% to 70%.

16 Claims, 1 Drawing Sheet

FOREIGN PATENT DOCUMENTS

| | | |
|---|---|---|
| JP | 57061686 | 9/1980 |
| JP | 59010345 | 7/1982 |
| JP | 61239100 | 4/1985 |
| JP | 7286514 | 10/1995 |
| WO | WO99/46028 | 9/1999 |
| WO | WO 00/33946 | 6/2000 |

OTHER PUBLICATIONS

Hewitt, "*Thin Wall Ceramics as Monolithic Catalyst Support*", *SAE Technical Papers*, Document No. 800082, Feb. 25, 1980.

Hewitt et al., "*Flow Effect in Monolithic Honeycomb Automotive Catalytic Converter*", *SAE Technical Papers*, Document No. 740244, Feb. 25, 1974.

\* cited by examiner

CATALYST CARRIER HOLDING MATERIAL AND CATALYTIC CONVERTER

CROSS REFERENCE TO RELATED APPLICATIONS

This application is a national stage filing under 35 U.S.C. 371 of International Application No. PCT/US02/19904 filed Jun. 21, 2002, which claims priority to the Japanese Patent Application No. 2001-190005 filed Jun. 22, 2001, the disclosure of which is incorporated by reference in its/their entirety herein.

FIELD OF THE INVENTION

The present invention relates to a catalyst carrier holding material, and more specifically, it relates to a catalyst carrier holding material with excellent heat resistance, compression resistance and wind erosion resistance. The present invention also relates to a catalytic converter packed with the catalyst carrier holding material. The catalytic converter of the invention can be advantageously utilized for treatment of exhaust gas from an internal combustion engine, such as that of an automobile. The catalytic converter is preferably a catalytic converter holding a catalytic element within its casing.

BACKGROUND OF THE INVENTION

Exhaust gas purification systems employing ceramic catalytic converters are well known as means for removing the carbon monoxide (CO), hydrocarbons (HC), nitrogen oxides (NOx) contained in exhaust gas from automobile engines. A ceramic catalytic converter basically comprises a ceramic catalyst carrier (this is usually called the "catalytic element") in the shape of a honeycomb, for example, housed in a metal casing, or housing.

As is known, there exist many different types of ceramic catalytic converters, but the usual construction employed has the gap between the housed catalyst carrier and the casing filled in with a heat insulating material typically composed of a combination of inorganic fibers with organic fibers and/or a generally liquid or paste-like organic binder as disclosed in, for example, Japanese Unexamined Patent Publication (Kokai) Nos. 57-61686, 59-10345 and 61-239100. The heat insulating material filling in the gaps thus holds the catalyst carrier, and can prevent unexpected mechanical shock due to impact or vibrations from being exerted on the catalyst carrier. Since the catalyst carrier is not destroyed or shifted in a catalytic converter with this type of construction, the desired operation can be realized for extended periods.

Incidentally, it is preferred for catalytic converters to be operated at higher temperatures in order to improve the exhaust gas purification and enhance combustion. Particularly in recent years, with the movement toward tougher standards for exhaust gas with the aim of protecting the earth environment, there has been a trend toward more efficient purification of exhaust gas by increasing the operating temperature. In fact, operating temperatures for catalytic converters have reached as high as 800-1000° C., and even higher. However, insulating materials such as those disclosed in the aforementioned unexamined patent publications cannot be applied for operating temperatures in such high ranges, because of their composition and others.

Attention has recently been directed toward insulating materials composed mainly of crystalline alumina fibers, which can withstand high operating temperatures, and products using them have been implemented. As one example, Japanese Unexamined Patent Publication (Kokai) No. 7-286514 discloses a holding material (corresponding to an insulating material) for use in an exhaust gas purification apparatus characterized by being composed of a blanket wherein crystalline alumina fibers are arranged in layers, and sections of the fibers are oriented in the direction normal to the layer surface by needle punching. The alumina fibers used for this holding material must have a mullite composition with an alumina to silica weight ratio of 70/30 to 74/26. If the alumina to silica weight ratio is outside of this range, deterioration of the fibers occurs more rapidly due to crystallization and crystal growth at high temperature, such that the material cannot withstand use for extended periods.

Nevertheless, with the exhaust gas purification apparatus holding material described in Japanese Unexamined Patent Publication (Kokai) No. 7-286514, not only are the desired function and effect exhibited only when using alumina fibers having a mullite composition in the aforementioned limited range, but using alumina fibers with a low mullite ratio (for example, a few percent) results in increased plastic deformation and poor bearing retention (compression resistance) in high temperature ranges. Furthermore, since the compression resistance tends to rapidly decrease as a result of use at high temperature even if the compression resistance at the initial stage is satisfactory, it is very difficult to maintain high compression resistance for extended periods. On the other hand, when using alumina fibers with a high mullite ratio (for example, 75% or more), the compression resistance in high temperature ranges is improved because of reduced plastic deformation, but the higher brittleness which also occurs results in easier breakage of the alumina fibers, such that it is impossible to avoid worsening of "wind erosion" (a phenomenon in which the holding material crumbles at both ends due to wind pressure). As this wind erosion continues to progress, it causes dwindling of the surface area of the holding material which is supposed to exhibit holding force, and this leads to lower overall compression resistance and thus inconveniences such as shifting of the catalyst carrier. These properties are mutually opposing, and it is preferred to provide an exhaust gas purification apparatus holding material that simultaneously satisfies both properties of high compression resistance in high temperature ranges and its maintenance, together with excellent wind erosion resistance.

SUMMARY OF THE INVENTION

As explained above, various types of insulating materials have been proposed in the past for application in catalytic converters, but all such insulating materials have room for improvement.

It is therefore an object of the present invention to provide a catalyst carrier holding material which exhibits heat resistance, high compression resistance in high temperature ranges and excellent wind erosion resistance, which is particularly useful in catalytic converters.

It is another object of the invention to provide a catalytic converter packed with such a catalyst carrier holding material for the purpose of heat insulation, catalyst carrier holding, etc.

It is yet another object of the invention to provide a catalytic converter which can be advantageously used for treatment of exhaust gas in the internal combustion engine of an automobile or the like.

These and other objects of the invention will become readily apparent by way of the detailed description which follows hereunder.

According to the present invention, the above problems can be solved by a catalyst carrier holding material which serves to hold a catalyst carrier, it is composed of or comprises inorganic fibers comprising alumina and silica, and the mullite ratio of the inorganic fibers is in the range of greater than 30% and less than 75%, and preferably in the range of 35-70%.

The inorganic fibers used in the catalyst carrier holding material can be a blend of fibers containing less than 10% mullite and fibers containing greater than 70% mullite. In addition, the catalyst carrier holding material can comprise layers of the inorganic fibers, with at least one layer comprising fibers containing less than 10% mullite and at least one other layer comprising fibers containing greater than 70% mullite.

According to the present invention, there is also provided a catalytic converter equipped with a casing, a catalytic element situated in the casing and a catalyst carrier holding material situated between the casing and the catalytic element.

The catalyst carrier holding material is composed of or comprises inorganic fibers comprising alumina and silica, and the mullite ratio of the inorganic fibers is in the range of greater than 30% and less than 75%, and preferably in the range of 35-70%.

DETAILED DESCRIPTION OF THE INVENTION

The present invention will now be explained by way of its preferred embodiments. As will be readily apparent to any person skilled in the art, the invention is not limited to these embodiments, and various modifications and improvements may be incorporated therein within the spirit of the invention.

The catalytic converter according to the present invention has a construction comprising at least a casing and a catalytic element situated in the casing, with a catalyst carrier holding material according to the invention described in detail hereunder packed between the casing and the catalytic element, in such a manner as to surround the catalytic element. Depending on the purpose of use, the catalyst carrier holding material may loaded in a section of the catalytic element, or loaded in the entirety thereof. If necessary, attaching means such as wire mesh may be used as supplementary means. The catalyst carrier holding material is preferably used with appropriate compression, so that it has the proper density when loaded into the casing. Compression methods include clamshell compression, stuffing compression, tourniquet compression and the like.

The catalytic converter of the present invention encompasses many types of catalytic converters, but it is preferably a catalytic converter provided with a monolithically molded catalytic element, i.e., a monolithic catalytic converter. This type of catalytic converter comprises a catalytic element with a honeycomb-shaped cross-section having small channels and is therefore smaller than conventional pellet-type catalytic converters, and the contact area with the exhaust gas can be sufficiently ensured while also minimizing the exhaust resistance; as a result, it is possible to treat exhaust gas in a more efficient manner.

The catalytic converter of the present invention may be advantageously used for treatment of exhaust gas when combined with various types of internal combustion engines. The excellent function and effect are exhibited in sufficient fashion when the catalytic converter of the invention is mounted in the exhaust system of an automobile such as a passenger vehicle, bus, truck or the like.

Figure 1:
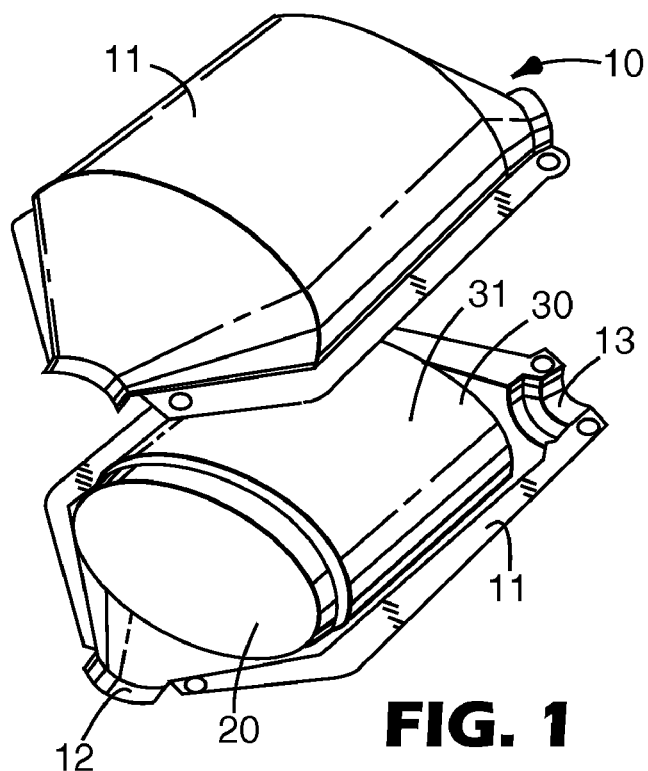
FIG. 1 is an expanded perspective view of a preferred embodiment of a catalytic converter according to the present invention.

FIG. 1 is a perspective view showing a typical example of a catalytic converter according to the present invention, and it shows an expanded view of the catalytic converter, for easier explanation of the construction. The illustrated catalytic converter 10 is provided with a metal casing 11, a monolithic solid catalytic element 20 situated inside the metal casing 11, and a catalyst carrier holding material 30 situated between the metal casing 11 and the catalytic element 20. The catalyst carrier holding material 30 is constructed of inorganic fibers composed of or comprising alumina and silica, and the mullite ratio of the inorganic fibers is in the range of greater than 30% and less than 75%, and preferably in the range of 35-70%, as according to the invention. As will be explained in detail below, the catalyst carrier holding material 30 has a coating 31 to protect the surface from damage. The coating 31 may of course be omitted if it is not necessary. An exhaust gas inlet 12 and exhaust gas outlet 13 each having a truncated cone shape are incorporated in the shape of the catalytic converter 10.

As a more specific explanation, the solid catalytic element in the metal casing comprises a ceramic catalyst carrier with a honeycomb structure having a plurality of exhaust gas channels (not shown). The catalyst carrier holding material of the invention is placed so that it envelops the catalytic element. In addition to functioning as an insulating material, the catalyst carrier holding material also holds the catalytic element inside the metal casing and seals the gap created between the catalytic element and the metal casing, either to prevent the exhaust gas from flowing around the catalytic element or at least to minimize such undesirable flow. The catalytic element is supported firmly and elastically inside the metal casing.

The metal casing in the catalytic converter of the present invention may be fabricated from any of various metal materials publicly known in the field, into any desired shape depending on the intended function and effect. A suitable metal casing is made of stainless steel in the shape shown in FIG. 1. If necessary, of course, the metal casing may be fabricated into any desired appropriate shape from a metal such as aluminum or titanium, or an alloy thereof.

Like the metal casing, the solid catalytic element will usually be fabricated from the same manner of material used for common catalytic converters, and in a similar shape. Suitable catalytic elements which are well known in the field include those manufactured from metal, ceramic and the like. A useful catalytic element is disclosed, for example, in U.S. Reissued Pat. No. 27,747. Ceramic catalytic elements are commercially available from Corning Inc., USA, and elsewhere. For example, honeycomb-shaped ceramic catalyst carriers are commercially available from Corning Inc. under the trade name "CELCOR", and from NGK Insulated Ltd. under the trade name "HONEYCERAM". Metal catalytic elements are commercially available from Behr GmbH and Co., Germany. For a detailed description regarding monolithic catalysts, refer to, for example, "System Approach to Packaging Design for Automotive Catalytic Converters" by Stroom et al., SAE Technical Papers, Document No. 900500; "Thin Wall Ceramics as Monolithic Catalyst Support" by Howitt et al., SAE Technical Papers, Document No. 800082; and "Flow Effect in Monolithic Honeycomb Automotive Catalytic Converter" by Howitt et al., SAE Technical Papers, Document No. 740244.

Catalysts to be carried in the aforementioned catalytic elements will usually be metals such as platinum, ruthenium, osmium, rhodium, iridium, nickel, palladium, etc. and metal oxides such as vanadium pentaoxide, titanium dioxide, etc., and they are preferably coated for use. A detailed explanation on coating of such catalysts may be found in U.S. Pat. No. 3,441,381.

In the practice of the present invention, the catalytic converter may be fabricated with any desired construction and method, provided that it is within the scope of the invention. The catalytic converter is basically fabricated by housing in a metal casing a honeycomb-shaped ceramic catalyst carrier (catalytic element), for example, and it is particularly preferred to fabricate the catalytic element by carrying a catalyst layer (catalyst coating) comprising a precious metal such as platinum, rhodium or palladium on a honeycomb-shaped ceramic monolith, for example. Employing such a construction can exhibit an effective catalytic function at relatively high temperatures.

According to the present invention, the catalyst carrier holding material of the invention is situated between the metal casing and the catalytic element inside it. The catalyst carrier holding material may be constructed of a single member, or it may be constructed of two or more members in a laminated or bonded fashion. It will usually be advantageous from the standpoint of manageability for the catalyst carrier holding material to be in the shape of a mat, blanket or the like. The size of the catalyst carrier holding material, of course, may be varied within a wide range depending on the purpose of use. For example, when a mat-shaped catalyst carrier holding material is to be used to fill an automotive catalytic converter, the holding material will normally have a mat thickness of approximately 1.5-10.0 mm, a width of approximately 100-1000 mm and a length of approximately 200-1500 mm. Such a holding material may, if necessary, be cut into the desired shape and size with scissors, a cutter or the like.

The inorganic fibers composing the catalyst carrier holding material consist of inorganic fibers containing alumina ($Al_2O_3$) and silica ($SiO_2$), as mentioned above. The inorganic fibers comprise these two components of alumina and silica, preferably with an alumina/silica mixing ratio in the range of 50:50 to 80:20. If the alumina/silica mixing ratio is outside of this range, for example if the alumina mixing ratio is less than 50%, an undesirable situation of poor heat resistance may result.

The proportion of mullite ($3Al_2O_3 \cdot 2SiO_2$) present in these inorganic fibers, i.e. the mullite ratio, is in the range of greater than 30% and less than 75%, and preferably in the range of 35-70%, more preferably in the range of 60-70%, and most preferably around 65%. According to the present invention, setting the mullite ratio of the inorganic fibers of the catalyst carrier holding material within the range of greater than 30% and less than 75%, and preferably in the range of 35-70%, can give an improved holding material with relatively high initial bearing, which simultaneously allows minimized bearing reduction and prevents lowered wind erosion resistance. Incidentally, if the mullite ratio is too much below 35%, the initial bearing is high but increased plastic deformation reduces the bearing retention in high temperature ranges. Conversely, if the mullite ratio is too much higher than 70%, the bearing retention reduction can be minimized since increasing plastic deformation is prevented, but the higher mullite ratio also leads to greater brittleness, thus leading to greater brittleness of the fibers themselves. As the inorganic fibers become more brittle, the fibers tend to break up more finely during molding of the mat, and this results in a loss of wind erosion resistance which is another of the important properties for use of the catalyst carrier holding material, as well as lower initial bearing.

Described in detail, the mullite ratio of the inorganic fibers, if it is referred to in the specification of this application, can define as a ratio of peak strength determined in accordance with the following procedure.

A sample of the inorganic fibers for which a mullite ratio should be determined is introduced in a X-ray diffractometric apparatus to determine a peak strength "A" at a diffraction angle of 26.3°. Then, the inorganic fibers having the same alumina/silica ratio and average diameter as those of the sample are heated at 1500° C. for 8 hours to prepare a standard sample. The standard sample is introduced in a X-ray diffractometric apparatus to determine a peak strength "$A_0$" at a diffraction angle of 26.3°. The mullite ratio of the inorganic fibers, tested as the sample, is defined as a percentage of $A/A_0$.

For the reference, the X-ray diffractometric apparatus used herein is "RINT 1200" (trade name) commercially available from Rigaku Denki Kabushikikaisha, and the determination was carried out under the following conditions.

Tube Voltage: 40 kV
Tube Current: 30 mA
Target: Cu
Angle: 20-40°
Scan speed: 2°/min.
Step sampling: 0.02°
Slit (RS): 0.3 mm
Smoothing Point: 13

The inorganic fibers may be used alone, or combinations of two or more types of fibers may be used. In particular, using a mixture of two or more different types of inorganic fibers with different mullite ratios can more easily achieve the effect described above, while also allowing fine adjustment of the effect. For example, reduced bearing can be compensated by inorganic fibers with a high mullite ratio, while reduced wind erosion resistance can be compensated by inorganic fibers with a low mullite ratio.

The thickness (mean diameter) of the inorganic fibers is not particularly restricted, but the fibers preferably have a mean diameter of 2-7 μm. If the inorganic fibers have a mean diameter smaller than 2 μm, they tend to be brittle with insufficient strength, whereas if they have a mean diameter of larger than 7 μm, they tend to be less suitable for molding into a holding material.

As with the thickness, there are likewise no particular restrictions on the lengths of the inorganic fibers. However, the inorganic fibers preferably have an average length of 0.5-50 mm. If the inorganic fiber length is smaller than 0.5 mm, the effect of the holding material formed using those fibers may not be exhibited, whereas if it is larger than 50 mm the fibers become difficult to manage, thus complicating smooth progress in the holding material manufacturing process.

The catalyst carrier holding material of the present invention may also contain other additional components with the aforementioned inorganic fibers, for integration of the inorganic fibers or for other purposes. Suitable additional components include, but are not limited to, integrating components, flocculating agents, heat expanding agents, etc.

The catalyst carrier holding material of the present invention may be manufactured by any of various well-known and commonly employed methods. Such manufacturing methods can include wet methods, or dry methods utilizing a needle punch or the like. According to the invention, wet methods may be used with particular advantages. Such methods involve simpler manufacturing processes and do not require large-scale manufacturing equipment. As an example, the catalyst carrier holding material of the invention may be advantageously manufactured by the following wet method.

First, the inorganic fibers and binder are placed in water, for opening and mixing of the fibers. Next, the mixture is stirred while adding an inorganic or organic flocculating agent thereto to prepare a slurry. The slurry is then sheeted and molded into the desired shape. The thus obtained molded product is squeezed to remove the excess moisture. Next, the molded product is pressed while heating at the desired temperature for drying to obtain a holding material. This operation may be carried out, for example, by placing the molded product into an oven and heating and drying at 150° C. for 20 minutes. If necessary, the holding material may be made into a laminated product.

Following this, at least one side of the dried holding material is coated with an appropriate coating material by a well known commonly employed technique such as spraying or coating, and optionally laminated with tape. In most cases, the coating material will be diluted 2- to 10-fold with a solvent (for example, water or an organic solvent) and then coated onto at least one side, preferably both the front and back sides, of the holding material. The desired holding material may be obtained in this manner.

EXAMPLES

The present invention will now be explained by way of examples. It is to be understood, however, that the invention is in no way limited to these specific examples.

Example 1

Manufacture of Catalyst Carrier Holding Materials (Mats)

The following seven different mat-shaped catalyst carrier holding materials were manufactured using inorganic fibers composed of or comprising the two components alumina and silica, having an alumina/silica mixing ratio of 72:28 and different mullite ratios (2%, 35%, 60%, 70% and 78%).

For manufacture of each of the holding materials, first the inorganic fibers (a mixture of two different inorganic fibers for manufacture of holding material G) and the organic binder (trade name: "LX-816") (flocculating agent) were placed in water, and the fibers were opened and mixed. Next, the mixture was gently stirred to prepare a slurry. The slurry was then sheeted and molded into the desired mat shape. The molded product was squeezed to remove the excess moisture, and then the mat was pressed while heating to dryness at the prescribed temperature. This yielded the following catalyst carrier holding materials each having a thickness of 8 mm, a width of 250 mm and a length of 250 mm.

Holding material A . . . 2% mullite ratio of inorganic fibers

Holding material B . . . 35% mullite ratio of inorganic fibers

Holding material C . . . 60% mullite ratio of inorganic fibers

Holding material D . . . 65% mullite ratio of inorganic fibers

Holding material E . . . 70% mullite ratio of inorganic fibers

Holding material F . . . 78% mullite ratio of inorganic fibers

Holding material G . . . Mixture of inorganic fibers with 2% mullite ratio and inorganic fibers with 78% mullite ratio (50/50 mixing ratio)

Evaluation of Properties of Catalyst Carrier Holding Materials

The bearing retention (compression resistance) and wind erosion resistance of the catalyst carrier holding materials A-G manufactured in Example 1 were measured according to the following procedure.

Measurement of Bearing Retention:

The mat-shaped holding material was cut into a 45 mm diameter disk, and its weight was measured. Next, the disk-shaped holding material sample was sandwiched between two stainless steel plates, and pressed in the direction of its thickness to a packing density of 0.3 g/cm$^3$ (ignoring the loss of organic components, etc. by firing). Next, the holding material sample was heated to 900° C. and the bearing at that time was measured. In order to determine the change in bearing with time, the bearing measurement was continued for 20 hours, once every hour, where time 0 was the point of initial measurement. The change in bearing can be approximated using the formula $Y=aX^b$ (where X is the compression force), and b was the slope of the change in bearing. The evaluation was based on the slope of the curve of measured change with time at 900° C., with acceptable samples evaluated or judged as O and unacceptable samples evaluated or judged as x.

Measurement of Wind Erosion Resistance:

The mat-shaped holding material was cut into a flat sample with a width of 25 mm and a length of 50 mm, and the weight was measured. Next, the flat holding material sample was sandwiched between two stainless steel plates, and pressed in the direction of its thickness to a packing density of 0.2 g/cm$^3$ (ignoring the loss of organic components, etc. by firing). While heating one of the plates to 800° C. and the other plate to 600° C., compressed air at 90 kPa heated to 600° C. was blown onto one end of the holding material sample (in the widthwise direction) for a period of 2 hours. Upon completion of the compressed air blowing, the wind erosion per unit time was determined. The evaluation was based on the measured wind erosion, with acceptable samples evaluated as O and unacceptable samples evaluated as x.

Figure 2:
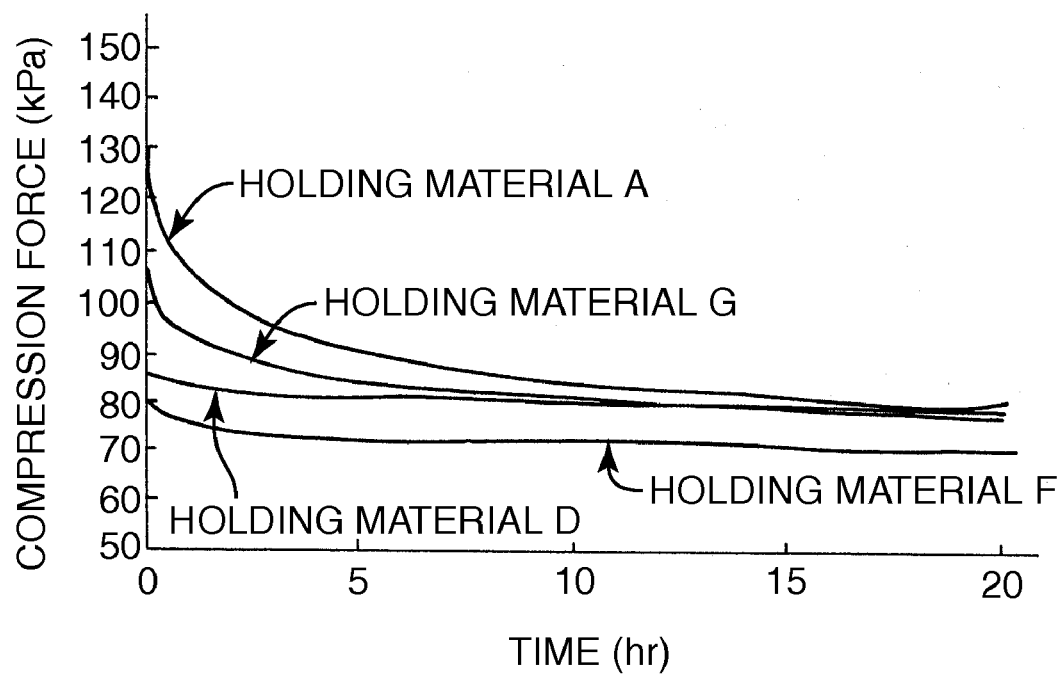
FIG. 2 is a graph showing a time plot of the changes in bearing at 900° C.

Table 1 below summarizes the results of the two different evaluation tests described above. FIG. 2 is a graph showing a time plot of the changes in bearing at 900° C. for holding materials A, D, F and G, for reference. The bearing change formula: $Y=aX^b$ for each of these holding materials was as follows.

Holding Material A . . . $Y=_{103.58}X^{-0.088}$

Holding Material D . . . $Y=_{83587}X^{-0.0368}$

Holding Material F . . . $Y=_{75.842}X^{-0.0213}$

Holding Material G . . . $Y=_{91.979}X^{-0.0548}$

TABLE 1

| Type of holding material | Slope of time change curve at 900° C. | Evaluation (Judge) | Wind erosion (g/hr) | Evaluation (Judge) | Extrapolated to 10 years later |
|---|---|---|---|---|---|
| Holding material A | −0.088 | X | 0.01 | ◯ | 38.1 |
| Holding material B | −0.0605 | ◯ | 0.02 | ◯ | 45.0 |
| Holding material C | −0.0428 | ◯ | 0.02 | ◯ | 53.8 |
| Holding material D | −0.0368 | ◯ | 0.03 | ◯ | 61.4 |
| Holding material E | −0.0387 | ◯ | 0.03 | ◯ | 82.1 |
| Holding material F | −0.0213 | ◯ | 0.10 | X | 59.5 |
| Holding material G | −0.0548 | ◯ | 0.02 | ◯ | 49.3 |

In this test, the pressure change with time at 900° C. was taken as the index for evaluating the durability of the ability to hold the catalyst carrier (holding force). A 10 year extrapolation with the pressure reduction approximating formula is usually used to determine the pressure necessary to stably hold a catalyst carrier (compression force). It is desirable for this pressure to be at least 35 kPa, preferably 45 kPa or greater, and more preferably 50 kPa or greater. When the evaluation results are considered from this viewpoint, the proper compression force is obtained when the mullite ratio is greater than 30%, preferably 35% or greater, and more preferably 60% or greater, and less than 78%.

Example 2

The desirable properties experienced with the present invention can be obtained from a mat made by blending low mullite content fiber (e.g., less than 10%) and high mullite content fiber (e.g., greater than 70%). Such properties can also be obtained, for example, with a layered mat, using low mullite content fibers for at least one layer and high mullite content fibers for at least one other layer.

Sample mat-shaped catalyst carrier holding materials were made as described for Example 1 above with 2% and 78% mullite content fibers. Fiber blend ratios and layering ratios were figured as average mullite % calculated by fiber weight and its fiber % mullite. For example, the average mullite % of a mat made of a 50/50 blend of these mullite fibers (i.e., 2% and 78% mullite content fibers) is 40%. Compression at 900 deg.C. and erosion resistance were evaluated and results were summarized below in Table 2.

Inclination is b in approximated equation: $Y=aX^b$

TABLE 2

| | Average Mullite % | Inclination of Compression | Extrapolated Compression after 10 yrs | Judge | Erosion (g/hr) | Judge | Total Judge |
|---|---|---|---|---|---|---|---|
| Blend | 2% | −0.088 | 38.1 | NG | 0.01 | Pass | NG |
| | 20% | −0.082 | 34.9 | NG | 0.01 | Pass | NG |
| | 30% | −0.068 | 43.1 | NG | 0.02 | Pass | NG |
| | 35% | −0.064 | 46.5 | Pass | 0.01 | Pass | Pass |
| | 40% | −0.054 | 49.3 | Pass | 0.02 | Pass | Pass |
| | 60% | −0.051 | 52.1 | Pass | 0.02 | Pass | Pass |
| | 70% | −0.037 | 62.0 | Pass | 0.03 | Pass | Pass |
| | 78% | −0.021 | 59.5 | Pass | 0.10 | NG | NG |
| Layered | 2% | −0.088 | 38.1 | NG | 0.01 | Pass | NG |
| | 20% | −0.076 | 39.2 | NG | 0.02 | Pass | NG |
| | 30% | −0.080 | 40.2 | NG | 0.01 | Pass | NG |
| | 35% | −0.066 | 45.7 | Pass | 0.02 | Pass | Pass |
| | 40% | −0.049 | 48.2 | Pass | 0.02 | Pass | Pass |
| | 60% | −0.035 | 55.4 | Pass | 0.02 | Pass | Pass |
| | 70% | −0.039 | 59.0 | Pass | 0.04 | Pass | Pass |
| | 78% | −0.021 | 59.5 | Pass | 0.10 | NG | NG |
| 65% Mullite Fiber | 30% | −0.071 | 41.0 | NG | 0.01 | Pass | NG |

As explained above, according to the present invention, there is provided a catalyst carrier holding material which is particularly useful for catalytic converters, by exhibiting heat resistance and high compression resistance in high temperature ranges, as well as excellent wind erosion resistance.

There is further provided according to the present invention a catalytic converter packed with a catalyst carrier holding material of the present invention for the purpose of heat insulation, catalyst carrier holding and the like.

There is still further provided according to the present invention a catalytic converter that can be advantageously utilized for treatment of exhaust gas from an internal combustion engine, such as that of an automobile.

I claim:

1. A catalyst carrier holding material comprising inorganic fibers comprising alumina and silica, said inorganic fibers having an average mullite percent greater than 30% and less than 75%.

2. A catalyst carrier holding material according to claim 1, wherein said inorganic fibers have an alumina to silica mixing ratio in the range of 50:50 to 80:20.

3. A catalytic converter comprising a casing, a catalytic element situated in said casing and a catalyst carrier holding material according to claim 1 being situated between said casing and said catalytic element.

4. A catalytic converter according to claim 3, wherein said inorganic fibers comprise the two components of alumina and silica, and the mixing proportion of the alumina and silica is in the range of 50:50 to 80:20.

5. A catalytic converter according to claim 3, wherein said catalytic element is a monolithic catalytic element.

6. A catalytic converter according to claim 3, wherein said inorganic fibers are a blend of fibers containing less than 10% mullite and fibers containing greater than 70% mullite.

7. A catalytic convener according to claim 3, wherein said holding material comprises layers of said inorganic fibers, with fibers in at least one layer contatning less than 10% mullite and fibers in at least one other layer containing greater than 70% mullite.

8. A catalyst carrier holding material according to claim 1, wherein said inorganic fibers have an average in mullite percent in the range of from 60% to 70%.

9. A catalyst carrier holding material comprising inorganic fibers comprising alumina and silica, said inorganic fibers being a blend of (a) inorganic fibers containing less than 10% mullite and (b) inorganic fibers containing greater than 70% mullite, wherein said blend has an average mullite percent in the range of from greater than 30% to less than 75%.

10. A catalytic converter comprising a casing, a catalytic element situated in said casing and a catalyst carrier holding material according to claim 9 being situated between said casing and said catalytic element.

11. A catalyst carrier holding material comprising multiple layers of inorganic fibers comprising alumina and silica, said inorganic fibers in at least one layer containing less than 10% mullite and said inorganic fibers in at least one other layer containing greater than 70% mullite, wherein said multiple layers have an average mullite percent in the range of from greater than 30% to less than 75%.

12. A catalytic converter comprising a casing, a catalytic element situated in said casing and a catalyst carrier holding material according to claim 11 being situated between said casing and said catalytic element.

13. A catalytic converter according to claim 12, wherein said inorganic fibers comprise the two components of alumina and silica, and the mixing proportion of the alumina and silica is in the range of 50:50 to 80:20.

14. A catalytic converter according to claim 12, wherein said catalytic element is a monolithic catalytic element.

15. A catalytic converter according to claim 14 wherein said inorganic fibers comprise the two components of alumina and silica, and the mixing proportion of the alumina and silica is in the range of 50:50 to 80:20.

16. A catalytic converter according to claim 14, wherein said catalytic element is a monolithic catalytic element.

* * * * *

UNITED STATES PATENT AND TRADEMARK OFFICE
CERTIFICATE OF CORRECTION

PATENT NO. : 7,261,864 B2 Page 1 of 1
APPLICATION NO. : 10/478946
DATED : August 28, 2007
INVENTOR(S) : Toshiyuki Watanabe It is certified that error appears in the above-identified patent and that said Letters Patent is hereby corrected as shown below:

Column 8 – Line 65, delete "$_{83587}X^-0.0368$" and insert -- $_{83.587}X^{-0.0368}$ --, therefor.

Column 10 – Line 49 – In Claim 7, delete "convener" and insert -- converter --, therefor.

Column 10 – Line 51 – In Claim 7, delete "contatning" and insert -- containing --, therefor.

Column 10 – Line 55 – In Claim 8, after "average" delete "in".

Column 12 – Line 10 – In Claim 16, delete "convertcr" and insert -- converter --, therefor.

Signed and Sealed this

Eighth Day of July, 2008

JON W. DUDAS
*Director of the United States Patent and Trademark Office*